United States Patent [19]

Shtarkman

[11] Patent Number: 4,504,044
[45] Date of Patent: Mar. 12, 1985

[54] DRY VISCOUS SPRING DAMPER

[75] Inventor: Emile M. Shtarkman, Euclid, Ohio

[73] Assignee: Imperial Clevite Inc., Glenview, Ill.

[21] Appl. No.: 436,331

[22] Filed: Oct. 25, 1982

[51] Int. Cl.³ .............................................. F16F 13/00
[52] U.S. Cl. ...................................... 267/35; 188/268;
267/63 A; 267/122; 267/140.1; 267/140.3;
267/141; 267/152; 267/153; 280/662; 280/697;
280/712; 280/716
[58] Field of Search ............... 188/268; 267/35, 63 A,
267/141, 152, 153, 140.1, 113, 122, 128, 140.3;
280/697, 712, 716, 662

[56] References Cited

U.S. PATENT DOCUMENTS

| | | | |
|---|---|---|---|
| 1,886,712 | 11/1932 | Messier | 188/268 |
| 2,460,116 | 1/1949 | Bazley | 188/268 X |
| 3,121,479 | 2/1964 | Dillenburger et al. | 188/268 X |
| 3,285,596 | 11/1966 | Burgert | 188/268 X |
| 3,380,557 | 4/1968 | Peterson | 188/268 X |
| 3,424,448 | 1/1969 | Chak Ma | 267/35 |
| 3,658,314 | 4/1972 | Luzsicza | 267/121 |
| 4,005,858 | 2/1977 | Lochner | 267/136 |
| 4,011,929 | 3/1977 | Jeram et al. | 188/268 |
| 4,052,088 | 10/1977 | Nicholls | 280/708 |
| 4,234,172 | 11/1980 | Takahashi | 267/152 X |
| 4,352,487 | 10/1982 | Shtarkman | 267/35 |
| 4,401,298 | 8/1983 | Eaton et al. | 267/141.1 X |

FOREIGN PATENT DOCUMENTS

| | | | |
|---|---|---|---|
| 446532 | 2/1948 | Canada | 267/140.1 |
| 137271 | 8/1979 | Fed. Rep. of Germany. | |
| 1152526 | 5/1969 | United Kingdom. | |
| 2004349 | 3/1979 | United Kingdom. | |
| 1543340 | 4/1979 | United Kingdom. | |
| 1601444 | 10/1981 | United Kingdom. | |

Primary Examiner—George E. A. Halvosa
Attorney, Agent, or Firm—Russell E. Baumann

[57] ABSTRACT

A dry viscous spring damper is provided particularly adapted for absorbing shocks, dissipating energy and load carrying and leveling of a vehicle. The spring damper is comprised of a first housing member at least partially received in a second housing member and joined at the second housing member with an elastomeric shear spring. The spring damper has a first chamber separated from a second chamber by an elastomeric diaphragm. A valve is provided for selectively pressurizing the second chamber with pressurized gas or air. A plurality of elastomeric particles are included in the first chamber whereby relative movement between the housing members operates to stress the shear spring and the elastomeric particles, and vary the volumes of the first and second chambers.

15 Claims, 7 Drawing Figures

DRY VISCOUS SPRING DAMPER

BACKGROUND OF THE INVENTION

The present invention relates generally to load carrying shock absorbers. More particularly, it relates to shock absorbers of the type which are mounted to vehicles and which use both an elastomeric spring and a selectively pressurizable gas chamber for absorbing shock, energy dissipation and carrying and leveling load. However, it will be appreciated by those skilled in the art that the invention can be readily adapted for use in other environments as, for example, where similar spring dampening devices are employed to protect or cushion other items.

Known spring damper devices of the type described have included elastomeric shear springs, elastomeric diaphragms, selectively pressurizable gas chambers and associated communicating fluid chambers including restrictive orifice means therebetween for retricting the flow of fluid between the fluid chambers. Such a spring dampening device is described in Application Ser. No. 208,013, filed Nov. 18, 1980, now abandoned, in the name of Shtarkman et al and assigned to the assignee of the subject application. In the Shtarkman et al application an expandable and contractable elastomeric bladder for separating a gas chamber from a fluid chamber in a viscous spring damper is provided. Varying the pressurization of the gas chamber is employed for varying the spring rate of the viscous spring damper, calibrating the damper or leveling a load supported thereby. In addition, fluid flow between the communicating fluid chambers absorbs and dampens the shock and spring forces occurring during operation of the device. Such a structure provides the advantageous operating characteristics of both a spring and a shock absorber in one package.

A particular problem inherent in viscous spring dampers including fluid chambers is the limitation of a short stroke. In other words, the extent of compressive reduction of the spring damper device may be unduly limited because the volume of fluid, that must be displaced between communicating fluid chambers, may become too great to allow compressive reduction of the device to a desired level. There may simply not be enough room for the fluid, which is typically an incompressible hydraulic fluid, to be displaced. As a result, failure of the viscous spring damper would occur upon compression of the device beyond a certain level, either occurring through facture of the device's housing or shear spring, or through shear spring bond failure.

Another problem with prior viscous spring dampers is instability of the spring characteristics upon excessive deflection of the device. Specifically, an elastomeric shear spring is stressed primarily in shear upon deflection of a viscous spring damper. However, in situations where the viscous spring damper is stroked or compressed beyond a point where the shear spring becomes unstable, the shear spring operates irregularly. On a load/deflection curve, this is manifested as a drop in load with increasing deflection, rather than a steady increase in load with increasing deflection. Once in this position, it is difficult for the spring to expand or "flip back" rapidly. Such difficulty further results in slow response in the operation of the viscous spring damper.

The present invention contemplates a new and improved dry viscous spring damper which overcomes all of the above referred to problems and others to provide a new viscous spring damper which is simple in design, economical to manufacture, readily adaptable to a plurality of load carrying and shock absorbing uses, and which provides improved shock absorption and energy dissipation.

BRIEF SUMMARY OF THE INVENTION

In accordance with the present invention, there is provided a dry viscous spring damper for carrying load and dampening structural agitation, comprising a first housing member at least partially received in a second housing member and joined at said second housing member with an elastomeric shear spring, thereby creating a central chamber. A plurality of elastomeric particles having particle sizes of 30 mesh or smaller are included in the first chamber. Relative movement between the outer and inner members operates to stress the shear spring and vary the volume of the chamber. The plurality of elastomeric particles provide spring and dampening forces in combination with the spring and dampening forces of the shear spring.

In accordance with another aspect of the present invention, there is provided a dry viscous spring chamber for carrying load and dampening structural agitation comprising a first housing member at least partially received in a second housing member and joined at said second housing member with an elastomeric shear spring. The spring damper has a first chamber separated from a second chamber by an elastomeric diaphragm and a first valve means for selectively pressurizing the second chamber with pressurized gas. A plurality of elastomeric particles having particle sizes of 30 mesh or smaller are included in the first chamber. Relative movement between the outer and inner members operates to stress the shear spring and vary the volumes of the first and second chambers. The plurality of elastomeric particles provide spring and dampening forces in combination with the spring and dampening forces of the shear spring and diaphragm.

In accordance with still another aspect of the present invention, the plurality of elastomeric particles comprise particles having a preferred aspect ratio of essentially 1 and highly irregular surfaces.

In accordance with a further aspect of the present invention, the first chamber further includes agglomeration inhibitors comprising polytetrafluoroethylene or silica powders in combination with the plurality of elastomeric particles to inhibit agglomeration of the particles during operation of the spring damper.

In accordance with yet another aspect of the present invention, the plurality of elastomeric particles included in the first chamber are sized in aggregation to fill the chamber upon relative movement between the first and second housing members to an extent to deflect the shear spring to a position where the shear spring is disposed over center.

In accordance with the present invention, there is provided a dry viscous spring damper for load carrying and dampening structural agitation comprising a first outer member joined to a connecting member by means of a first elastomeric shear spring and a second outer member joined to the connecting member by means of a second elastomeric shear spring. The first outer member includes a first gas chamber and a first elastomeric diaphragm and the second outer member includes a second gas chamber and a second elastomeric diaphragm. A main chamber is included in the connecting member and includes a plurality of elastomeric particles whereby relative movement between the outer members and connecting member operates to stress the shear springs, the elastomeric diaphragms and the plurality of elastomeric particles and vary the volumes of the chambers.

In accordance with another aspect of the present invention, the connecting member includes a first rigid wall portion and a second rigid wall portion. The first rigid wall portion is bonded to the first elastomeric shear spring and the second rigid wall portion is bonded to the second elastomeric shear spring. The first rigid wall portion is joined to the second rigid wall portion by a third elastomeric spring. The third elastomeric spring comprises a toroidally configured member including an annular inner chamber, which can include an additional plurality of elastomeric particles, and/or pressurized gas.

In accordance with yet another aspect of the present invention, means are provided for selective gas pressurization of at least one of the elastomeric diaphragms and associated gas chamber whereby the dry viscous spring damper is selectively adjustable to level a load.

One benefit obtained by use of the present invention is an improved viscous spring damper having improved operating characteristics.

Another benefit obtained from the present invention is an improved viscous spring damper having a plurality of elastomeric particles received in a chamber for load carrying, shock absorption, dampening, and energy dissipation.

Another benefit obtained from the present invention is a viscous spring damper which provides significantly longer stroke of operation with improved load versus deflection stability and improved spring response.

Other benefits and advantages for the subject new dry viscous spring damper will become apparent to those skilled in the art upon a reading and understanding of this specification.

BRIEF DESCRIPTION OF THE DRAWINGS

The invention may take physical form in certain parts and arrangement of parts, the preferred and an alternative embodiment of which will be described in detail in the specification and illustrated in the accompanying drawings which form a part hereof and wherein.

DETAILED DESCRIPTION OF THE INVENTION

Figure 1:
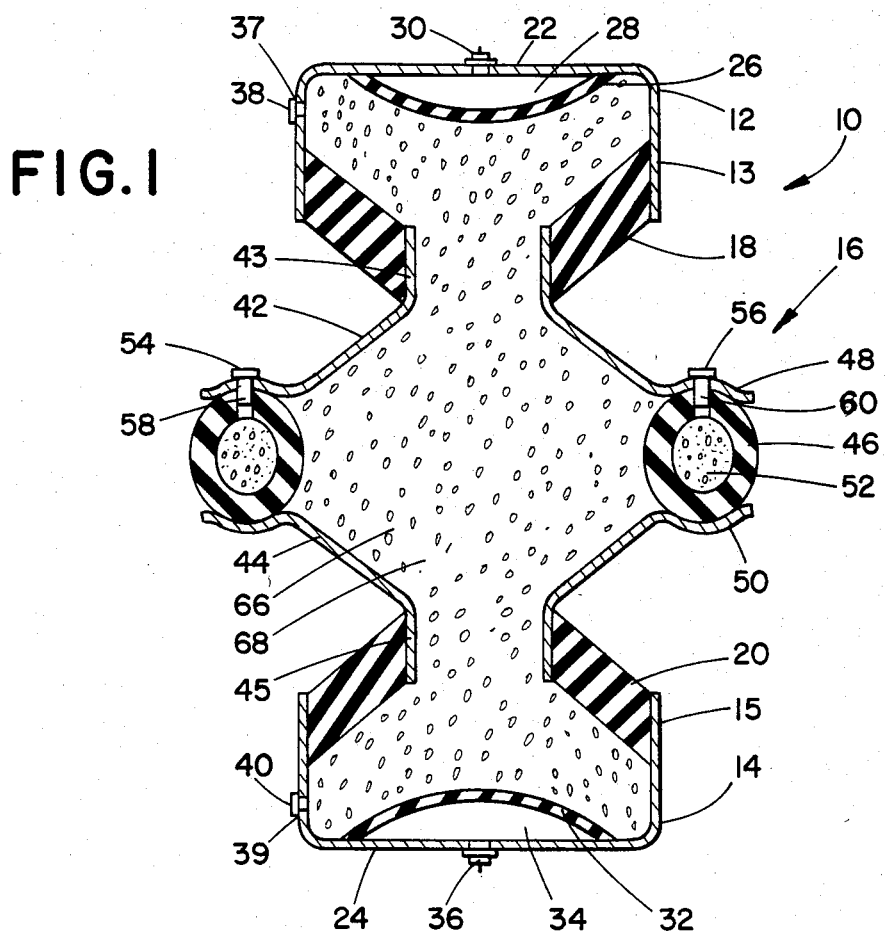
FIG. 1 is a cross-sectional elevational view of a preferred embodiment of a dry viscous spring damper constructed in accordance with the present invention.

Referring now to the drawings wherein the showings are for purposes of illustrating the preferred and an alternative embodiment of the invention only and not for purposes of limiting same, the FIGURES show a dry viscous spring damper 10 particularly useful for installation upon vehicles for carrying and leveling load, absorbing shock and dissipating energy. The invention is a combination of a spring and a damper in that it provides the characteristics of both a spring and a shock absorber in one package.

Figure 2:
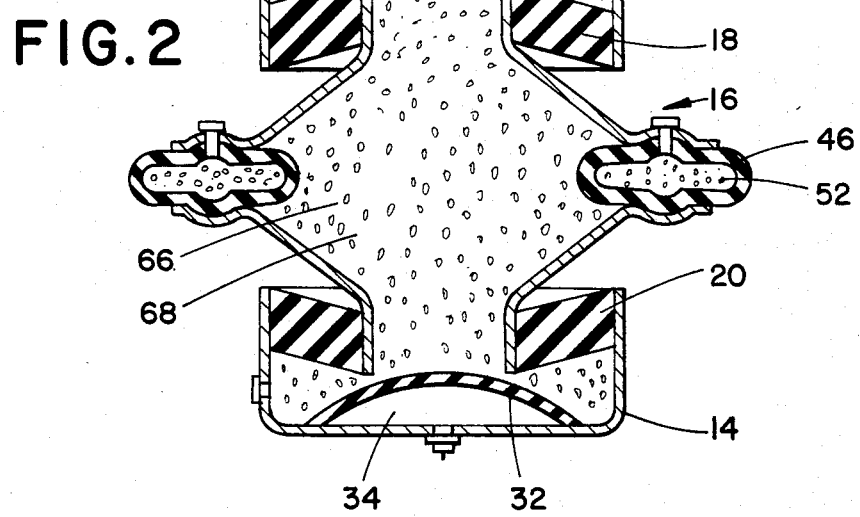
FIG. 2 is a cross-sectional view of the dry viscous spring damper of FIG. 1 showing the invention in a compressed state.

With particular reference to FIGS. 1 and 2, a preferred embodiment of a dry viscous spring damper 10 is illustrated. The damper 10 is comprised of a pair of opposed outer rigid members or housings 12,14 which are preferably constructed of a strong and durable material such as steel. First outer housing 12 is connected to an inner housing or connecting member 16 by a first elastomeric shear spring 18, and second outer member or housing 14 is connected to the inner connecting member 16 by a second elastomeric shear spring 20. First shear spring 18 is bonded to a side wall portion 13 of first housing member 12 and second shear spring 20 is similarly bonded to a side wall portion 15 of second housing member 14. First outer housing member 12 includes a first elastomeric diaphragm 26 and a selectively pressurizable gas chamber 28. Conventional gas fill means such as a valve 30 in base wall portion 22 may be advantageously employed for selective pressurization of the chamber 28. Similarly, second outer housing member 14 includes a second elastomeric diaphragm 32, a second selectively pressurizable gas chamber 34 and a conventional gas valve 36 in base wall 24 for filling the chamber 34. Preferably, air is employed for filling of the gas chambers 28,34; however, it is within the scope of the invention to include alternate gaseous mediums for filling of the chambers.

Inner housing or connecting member 16 includes a first rigid wall portion 42 bonded to first elastomeric shear spring 18 at flange portion 43 and a second rigid wall portion 44 bonded to second elastomeric shear spring 20 at a flange portion 45. First rigid wall portion 42 is joined to the second rigid wall portion 44 by a third elastomeric spring 46 bonded to opposed flange portions 48,50 of the first rigid wall portion and the second rigid wall portion, respectively. Third spring 46 preferably comprises a toroidally or donut configured member including an annular inner chamber 52. Access to inner chamber 52 is provided through filler ports 54,56 which may be typically sealed by conventional plugs 58,60 or by valves.

It is a particular feature of the invention that a main cavity or chamber 66 is provided in the outer housings 12,14 and inner housing 16 between opposed first and second elastomeric diaphragms 26,32 and that such main chamber 66 includes a plurality of solid elastomeric particles 68 to be particularly useful as the working medium for the invention which are essentially incompressible in volume. Elastomeric particles 68 may be constructed of various elastomeric substances, preferably a natural rubber compound with a Shore A harness range of 45 to 70, with an elongation-at-break of at least 500%, and with a carbon black loading such that the hysteretic properties are in the range of those normally used in automotive bushing compounds; and preferably comprise particles sized 30 mesh or smaller. The particles must be so sized that they act as a system of individual particles. At a particle size of 30 mesh or smaller, this occurs. Such a size range is best suited for employment in a viscous spring damper device of the type of the invention. It is also preferred that the particles have an aspect ratio of essentially 1 and have highly irregular surfaces. Access filler ports 38,40 in outer housing members 12,14 provide for filling main chamber 66 with the particles. These ports 38,40 may be typically sealed by plugs 37,39 or by valves. Additionally, a sealable gas filter means (not shown) may also be included in communication with chamber 66 for the filtered egress of gas or air therefrom.

Maintaining the individuality of the particles 68 is important to the proper functioning of the invention. If the particles become agglomerated, it has been found that performance suffers. Therefore, additives have been utilized to inhibit agglomeration. Such additives tend to coat the particles and not remain free in the main chamber 66. Particulate additives such as polytetrafluoroethylene powder and various types of silica which coat the elastomeric particles and have a mean particle size much smaller than the elastomeric particles have been found to be particularly useful. Alternatively, a liquid additive, such as silicone oil, may also be employed. In addition, a thin film deposit from a gas could also be utilized.

Because the medium of chamber 66 is a plurality of elastomeric particulates, packing efficiency is such that there are spaces between the individual particles. For non-compacted elastomeric particles with highly irregular surfaces, the particles may occupy less than 25% of the fill volume of chamber 66. The balance of the volume of chamber 66 may be a vacuum, or be filled with air or other gases such as nitrogen.

The medium of elastomeric particles provides both a spring rate and a dampening capacity for the invention. The complex interactions of the particles which cause deformation of individual particles and movement of the particles relative to each other are what produces these behavior characteristics. The spring and dampening rates can be tailored through appropriate choices of elastomeric particle types, sizes and shapes.

With particular reference to FIG. 1, the main cavity or chamber 66 of the dry viscous spring damper 10 may be completely filled with elastomeric particles as shown or could be only partially filled. However, when only partially filled, there must be sufficient elastomeric particles present so that the chamber 66 is filled when the device has been compressed to the point where elastomeric shear springs 18,20 extend normally to the bonding flanges 13,15,43,45 of the outer and inner housings. As will be further explained hereinafter, this is the point of deflection where the shear spring is disposed over center, and at which the elastomeric shear springs become unstable. The annular inner chamber 52 of third elastomeric spring 46 may or may not include elastomeric particles, and it may or may not be pressurized with gas.

Figure 6:
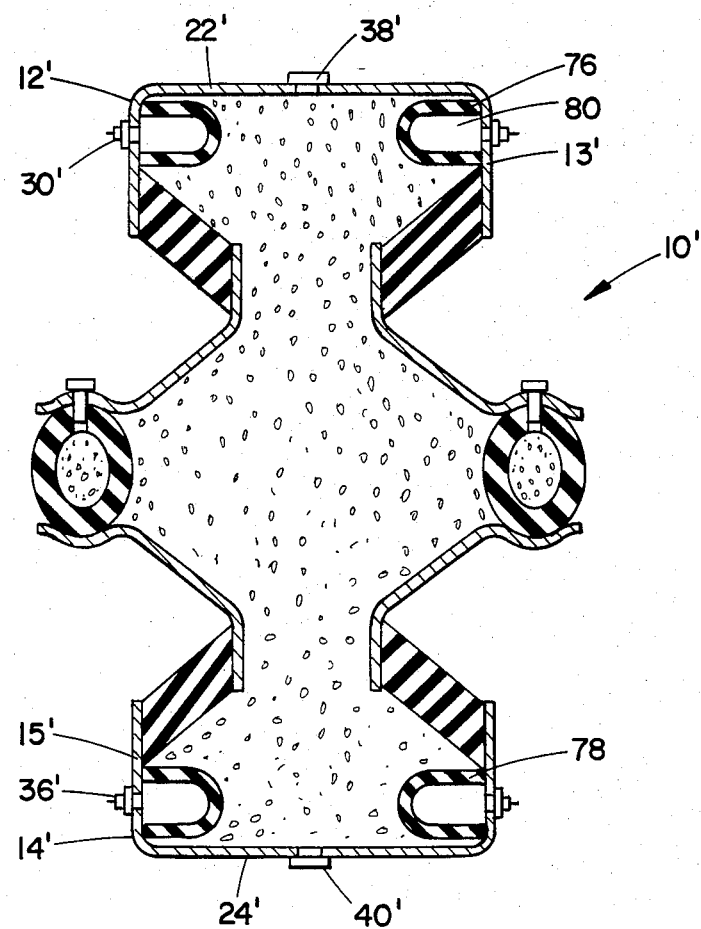
FIG. 6 is a cross-sectional elevational view of an alternative embodiment of a dry viscous spring damper constructed in accordance with the present invention; and, FIG. 7 is a cross-sectional view of the dry viscous spring damper of FIG. 6 showing the damper in a compressed state.
Figure 7:
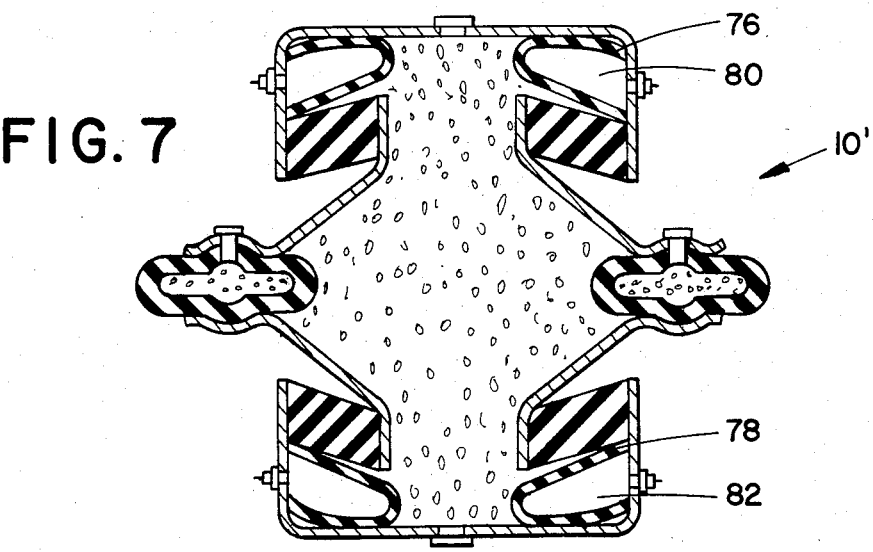

With particular reference to FIGS. 6 and 7, an alternative embodiment of the invention is shown. For ease of illustration and appreciation of this alternative, like components are identified by like numerals with a primed (') suffix, and new components are identified by new numerals. The alternative embodiment of a dry viscous spring damper 10' includes an alternately configured first elastomeric diaphragm 76 and selectively pressurizable gas chamber 80 and a second elastomeric diaphragm 78 and gas chamber 82 received in outer members or housings 12',14'. The end portions of the elastomeric diaphragms 76,78 are bonded against the side walls 13',15' of outer members 12',14' rather than against the base walls 22',24' as in the preferred embodiment. Such a configuration requires associated movement of the gas valves 30',36' to the side walls of the outer housings 12',14'. Filler ports 38',40' may then be located in the base walls of the outer housings.

In addition, and with reference to FIGS. 1 and 6, the benefits of the present invention will be achieved if diaphragms 26,32 and 76,78, respectively, are removed from the device illustrated therein. That is, while it is preferred to utilize a diaphragm in the device of the invention, such a diaphragm is not necessary to obtain a device having improved operational characteristics.

It will be readily apparent to those skilled in the art, however, that modification may be made to the structural details of the new dry viscous spring damper as described herein to accommodate particular operational needs and/or requirements. Such changes are not deemed to effect the overall intent or scope of the present invention. A structural including a first housing member joined to a second housing member by an elastomeric shear spring and including at least one elastomeric diaphragm and further including a selectively pressurizable gas chamber and a main cavity for receiving a plurality of elastomeric particles between the housing members and selectively pressurizable gas chamber would fall within the scope of the present invention.

OPERATION

With particular attention to FIGS. 2 through 5 and 7, the improved operational characteristics of the new dry viscous spring damper will be specifically discussed.

The invention is a combinatiom spring/damper in that it provides the characteristics of both a spring and a shock absorber in one package. FIG. 2 illustrates the device of FIG. 1 in a compressed state where elastomeric shear springs 18,20 have been stressed; where elastomeric diaphragms 26,32, pressurized gas chambers 28,34, connecting member elastomeric spring 46 and inner annular chamber 52 are compressed; and where the plurality of elastomeric particles 68 contained in the main cavity or chamber 66 and annular inner chamber 52 are also compressed. FIG. 7 illustrates the device of FIG. 6 in a compressed state where alternative elastomeric diaphragms 76,78 have been stressed and gas chambers 80,82 have been compressed. All these actions combine in operation to absorb the shock and/or support the load applied to the viscous spring damper 10. The plurality of elastomeric particles 68 further operates to dampen the spring response to the shock or load and to dissipate the energy of the spring upon expansion of the springs 18,20,46 to an equilibrium state. The employment of the elastomeric particles 68 presents a substantial improvement over prior art viscous spring dampers and particularly those viscous spring dampers that employed hydraulic fluids for dampening spring responses to shocks. One particular improved feature of operation is that for a given spring damper size, a significantly longer stroke can be realized with the structure of the present invention as opposed to a structure containing hydraulic fluids. More specifically, the system of a plurality of elastomeric particles 68 may compress where hydraulic fluid will not, thus allowing the present invention to be compressed to a point at which a prior art spring damper would fracture its housing or shear spring, or fail at a shear spring bond, thereby releasing fluid.

Figure 3:
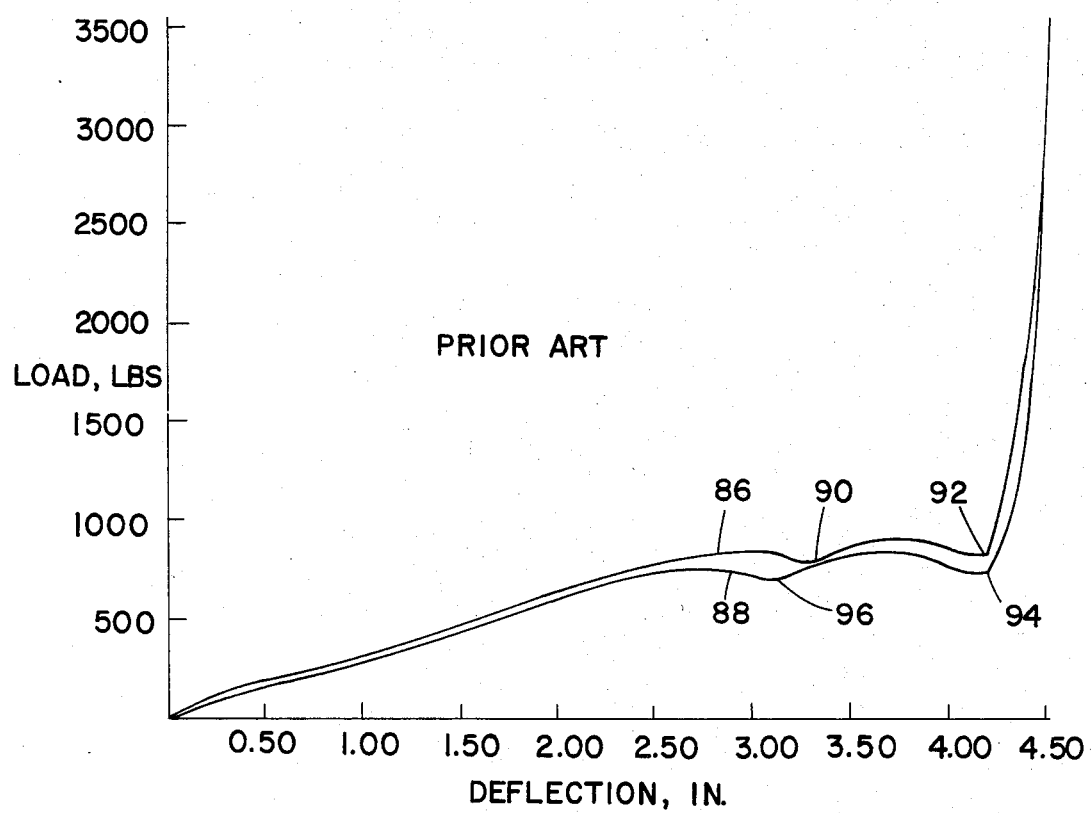
FIG. 3 is a graph showing the deflection characteristics of a prior art device.

Another operational characteristic and advantage of the present invention is one of improved stability. Since the elastomeric shear springs of a viscous spring damper are stressed primarily in shear during operation and shock absorption, instability can occur when the shear spring is stroked too far or "over center". In such an instance, spring tension drops briefly with increased deflection. With particular reference to FIG. 3, a load/deflection curve of a spring damper similar in construction to that of FIG. 1 but with appropriate restrictive orifice and hydraulic fluid flowing between communicating fluid chambers instead of elastomeric particles as illustrated. One line 86, of the curve of FIG. 2 represents the load/deflection curve on the compression of the device and a second line 88, represents the load deflection curve on rebound or reflection. It may be seen that two points of drop 90,92 and 94,96 occur respectively in the curves. The drops illustrate the point when the elastomeric shear springs are deflected over center and exhibit a drop in load with increasing deflection, rather than a steady increase in load on the spring with deflection. Once in the position of a drop or over center deflection, it is difficult for the spring to rebound or flip back rapidly. Such a slow response and the load versus deflection instability are undesirable characteristics of a viscous spring damper.

Figure 4:
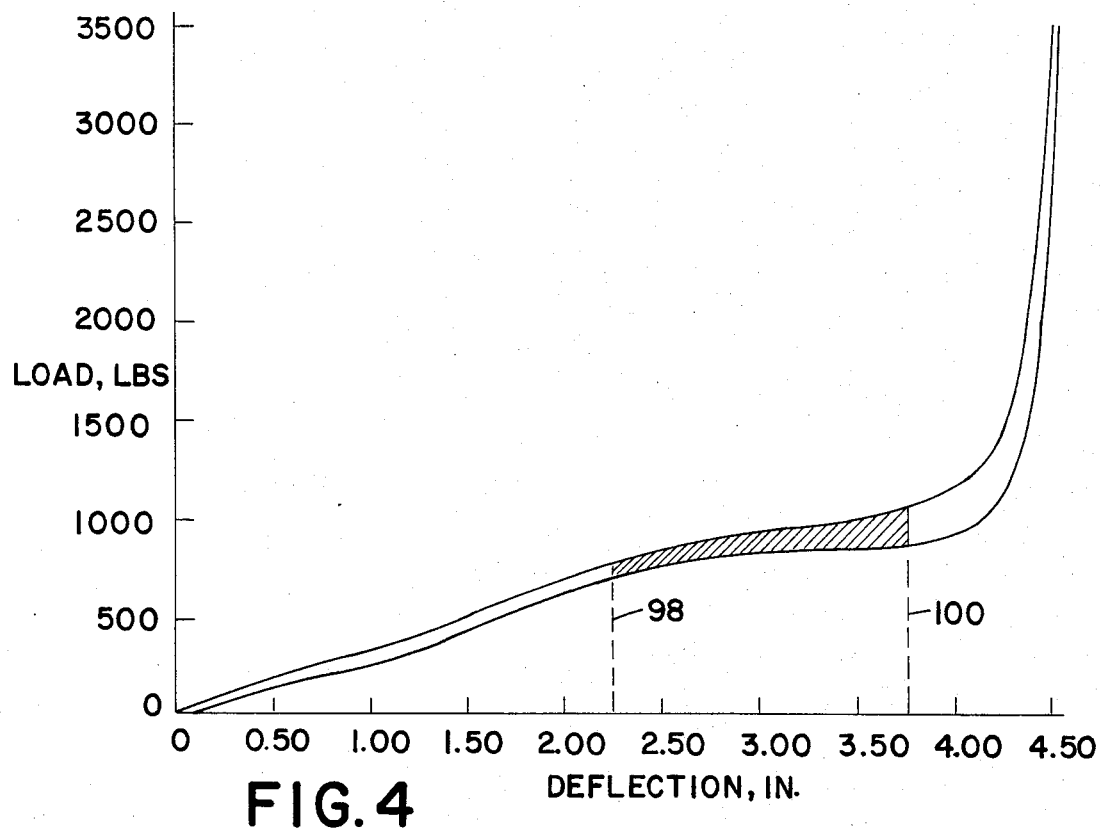
FIG. 4 is a graph showing the deflection characteristics of the present invention.

With particular reference to FIG. 4, an operational curve of the invention of FIG. 1 is shown and particularly illustrates that the undesirable operational characteristics of the shear spring being deflected over center are no longer present. The invention includes sufficient aggregate amounts of elastomeric particles such that the elastomeric particles are at least beginning to be compessed at a point on the curve before the drops or instability occur. The forces required to compress the elastomeric particles are then sufficient to overcome the loss of load which occurs when the elastomeric shear springs go over center, and as illustrated in the drops 90,92 and 94,96 of FIG. 3. With the plurality of elastomeric particles 68 in the main cavity or chamber 66 being under compression when the shear springs go over center, there is a substantial restoring force present to urge the shear springs back into their normal equilibrium position when the compressive load is removed. This provides the improved response time of the present invention. With reference to FIG. 4, it may be seen that the resulting load/deflection curve for the invention exhibits a steady increase in load versus deflection. In addition, such steady increase is a relatively flat sloped increase between points 98,100 which are the normally expected operating ranges of an automobile. Such a flat slope indicates a reasonably low spring rate for the viscous spring damper, which translates into a soft ride for rider comfort.

A means of load leveling can be achieved by pressurizing the main chamber 66. That is, if the device were normally statically loaded so as to be compressed a certain amount, when the static load is increased, the device is compressed a greater amount. To enable the device with a heavier load to have the same displacement as a normally loaded device, air can be added to the main chamber until the desired displacement is achieved. This is a desirable feature for an automobile rear suspension, which can experience substantial variation in load depending on passenger and trunk loading.

The present invention also provides alternate load leveling ability, and improved operational flexibility by the addition of selectively pressurizable gas chambers 28,34 and the toroidal or donut configured third elastomeric spring 46. As opposed to the addition of air or gas to the main chamber, the addition of air or gas to the selectively pressurizable gas chambers effectively increases the density of the elastomeric particles 68 contained in the main or central cavity 66 since the volume of the central cavity decreases upon increase in volume of the selectively pressurizable gas chambers 28,34. The higher particle density results in a greater spring rate for the device and a faster response for the device in rebound or reflection.

Figure 5:
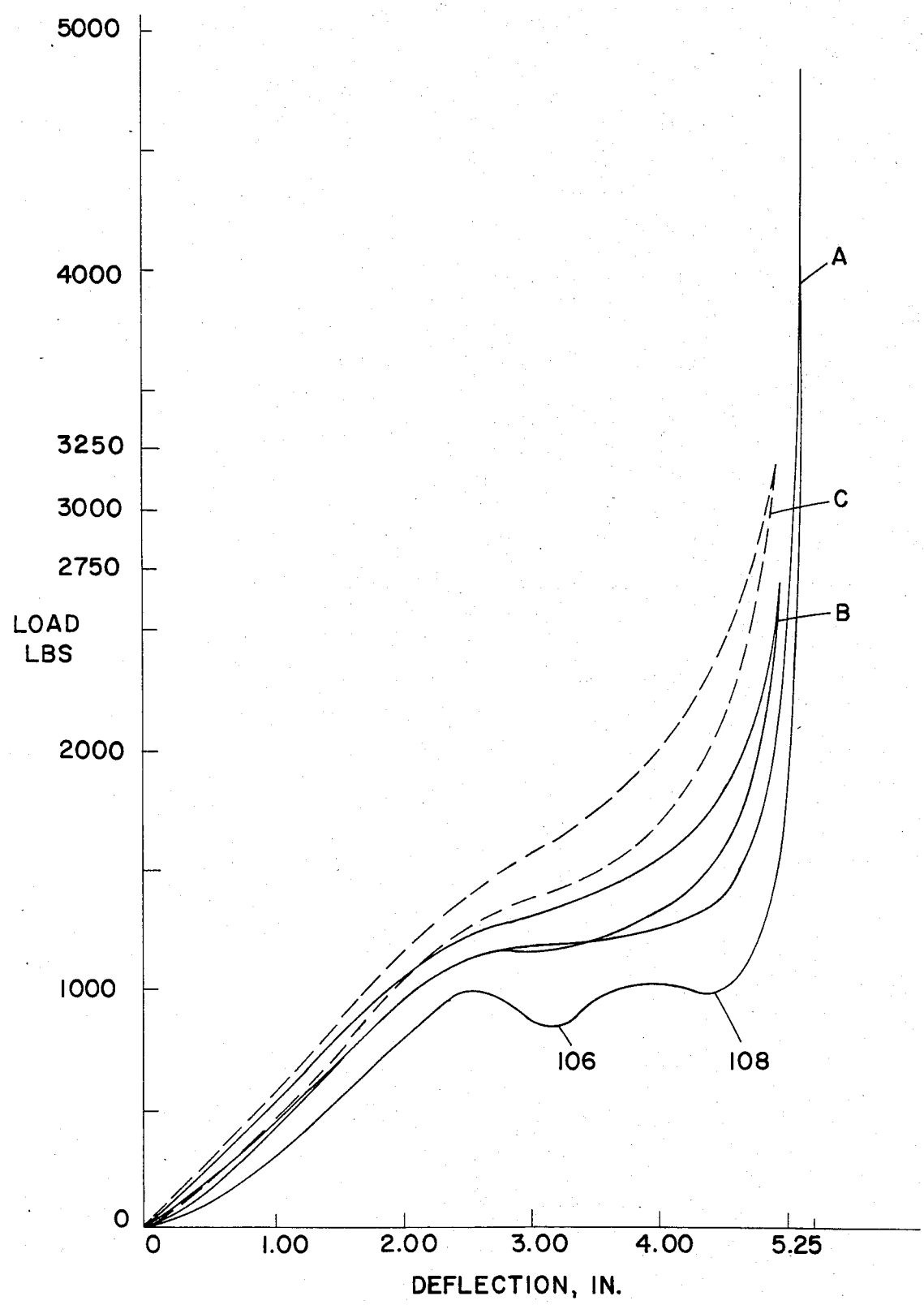
FIG. 5 is a graph showing the deflection characteristics of the present invention particularly illustrating the operational characteristics of the invention with modifications to the invention construction.

With particular reference to FIG. 5, curve A illustrates the load/deflection curve for a device similar to the construction of the device of FIG. 1 but lacking selectively pressurizable gas chambers 26,34 and with the main cavity 66 substantially filled with elastomeric particles. In the rebound portion of curve A, two drops 106,108 occur and illustrate that the elastomeric shear springs rebound or "jump back" faster than the aggregate of elastomeric particles can follow. Curves B and C of FIG. 5 are for the same device with approximately half the amount of elastomeric particles in the main cavity 66 but with selectively pressurizable air chambers 28,34 pressurized with air. Curve C indicates the invention including air chambers pressurized approximately three times the pressurization of curve B. Curves B and C illustrate that the invention can respond more rapidly with pressurization of gas chambers 26,34, despite the reduced amount of elastomeric particles, as shown by the lack of drops in the rebound curves. Also, the increase in slope between curves B and C shows how the spring rate increases as a function of increase in air pressure in the gas chambers. It has been found that as the elastomeric particle density remains fixed by the addition of air to the central cavity, the response time in rebound for the invention does not change and the spring rate in the operating region of the invention does not increase as rapidly as a function of pressure as for the case where the pressure is increased in the selectively pressurizable gas chambers. While the two drops 106,108 of curve A can be eliminated by the addition of more elastomeric particles to the main chamber, usually this will increase the spring rate to an unacceptable level, and would limit the maximum eflection possible with the device, which is one of its most important characteristics.

The toroidally configured or donut shaped elastomeric spring 46 of connecting member 16 also provides improved operational flexibility. Spring 46 serves as a soft, flexible connection between the rigid wall portions 42,44 of connecting member 16. In any type of vehicle suspension, some degree of pivoting is involved as wheels traverse bumps and dips. Depending on how and where the spring and shock absorber system of the suspension is mounted, a certain amount of bending or twisting of the suspension system is required. The donut configured elastomeric spring 46 of the present invention provides means for the invention to easily bend about its middle portions and thereby operates to preserve column loading on the elastomeric shear spring 18,20 which, in turn, provides improved operation. The aspect of the invention that the donut shaped spring 46 may include elastomeric particles or pressurized gas in its inner annular chamber 52 has also been found to provide improved spring and dampening operation.

The invention has been described with reference to the preferred and an alternative embodiment. Obviously, modifications and alterations will occur to others upon the reading and understanding of the specification. It is out intention to include all such modifications and alterations insofar as they come within the scope of the appended claims or the equivalents thereof.

Having thus described out invention, we now claim:

1. A viscous spring damper for carrying and leveling load and dampening structural agitation comprising a first housing member at least partially received in a second housing member and joined to said second housing member with an elastomeric shear spring, said spring damper having a first chamber separated from a second chamber by an elastomeric diaphragm, a first valve means foe selectively pressurizing said second chamber with pressurized gas, and a plurality of solid essentially incompressible in volume irregularly shaped elastomeric particles having particle sizes of about 30 mesh or smaller included in said first chamber and filling said first chamber at least to the extent that the particles interact one with another prior to the point of said shear spring being disposed over center, whereby relative movement between said members operates to stress said shear spring and vary the volumes of said first and second chambers thereby causing relative interaction between the solid incompressible individual particles thus promoting the desired damping and spring characteristic.

2. The viscous spring damper of claim 1 wherein said first chamber is provided with sealable gas filter means, and said plurality of elastomeric particles have an aspect ratio of about 1 and have highly irregular surfaces.

3. The viscous spring damper of claim 1 wherein said first chamber further includes an agglomeration inhibitor.

4. The viscous spring damper of claim 3 wherein said agglomeration inhibitor is at least one material selected from the group consisting of particulate polytetrafluoroethylene, silica particles and silicone oil.

5. In a viscous spring damper including inner and outer members connected by an elastomeric shear spring, having a first and a second chamber therebetween and an expandable and contractable gas chargeable elastomeric diaphragm segregating said first chamber from said second chamber, and a first valve means for selectively charging said diaphragm with gas pressure, the improvement comprising:

a plurality of solid essentially incompressible in volume irregular shaped elastomeric particles received in said first chamber and filling said first chamber at least to the extent that the particles interact one with another prior to the point of said shear sprinhg being disposed over center, said particles having a particle size of about 30 mesh or smaller and wherein relative movement between said member causes relative interaction between the solid incompressible individual particles thus promoting the desired damping and spring characteristics.

6. A viscous spring damper for carrying load and dampening structural agitation comprising a first housing member at least partially received in a second housing member and joined to said second housing member with an elastomeric shear spring, thereby creating a chamber, and a plurality of solid essentially incompressible in volume irregular shaped elastomeric particles having particle sizes of about 30 mesh or smaller included in said chamber and filling said chamber at least to the extent that the particles interact one with another prior to the point of said shear spring being disposed over center, whereby relative movement between said members operates to stress said shear spring and vary the volume of said chamber thereby causing relative interaction between the solid incompressible individual particles thus promoting the desired damping and spring characteristics.

7. The viscous spring damper of claim 6 wherein said chamber is provided with a sealable gas filter means and said plurality of elastomeric particles have an aspect ratio of about 1 and have highly irregular surfaces.

8. The viscous spring damper of claim 6 wherein said chamber includes an agglomeration inhibitor.

9. The viscous spring damper of claim 8 wherein said agglomeration inhibitor is at least one material selected from the group consisting of particulate polytetrafluoroethylene, silica particles and silicone oil.

10. A dry viscous spring damper for carrying load and dampening structural agitation comprising:

a first outer member joined to a connecting member by means of a first elastomeric shear spring, said first outer member including a first gas chamber and a first elastomeric diaphragm;

a second outer member joined to said connecting member by means of a second elastomeric shear spring, said second outer member including a second gas chamber and a second elastomeric diaphragm; and, a main chamber included in said connecting member containing a plurality of solid essentially incompessible in volume irregular shaped elastomeric particles which fill said main chamber at least to the extent that the particles interact one with another prior to the point of said shear springs being disposed over center having a particle size of 30 mesh or smaller whereby relative movement between said members operates to stress said shear springs, said elastomeric diaphragms, and said plurality of elastomeric particles and vary the volumes of said chambers whereby relative interaction between the solid incompressible individual particles promotes the desired damping and spring characteristics.

11. The dry viscous spring damper as defined in claim 10 wherein said connecting member includes a first rigid wall portion and a second rigid wall portion, said first rigid wall portion being joined to said first elastomeric shear spring and said second rigid wall portion being joined to said second elastomeric shear spring, said first rigid wall portion being joined to said second rigid wall portion by a third elastomeric spring.

12. The dry viscous spring damper as defined in claim 11 wherein said third elastomeric spring comprises a toroidally configured member including an annular inner chamber.

13. The dry viscous spring damper as defined in claim 12 wherein said annular inner chamber includes an additional plurality of elastomeric particles.

14. The dry viscous spring damper defined in claim 13 wherein a sealable access port is provided through said rigid wall portion of said connecting member and through said toriodally configured elastomeric member for the supply of said plurality of elastomeric particles and selective gas pressurization of said annularly configured chamber.

15. The dry viscous spring damper as defined in claim 10 wherein at least one of said outer members includes means for selective gas pressurization of at least one of said elastomeric diaphragms whereby said dry viscous spring damper is selectively adjustable to level a load supported thereby by pressurization of said diaphragm.

* * * * *